United States Patent [19]
Ramanujam

[11] Patent Number: 5,570,460
[45] Date of Patent: Oct. 29, 1996

[54] SYSTEM AND METHOD FOR VOLUME RENDERING OF FINITE ELEMENT MODELS

[75] Inventor: Gopalan Ramanujam, Austin, Tex.

[73] Assignee: International Business Machines Corporation, Armonk, N.Y.

[21] Appl. No.: 327,337

[22] Filed: Oct. 21, 1994

[51] Int. Cl.$^6$ ............................................. G06T 17/20
[52] U.S. Cl. ....................................................... 395/124
[58] Field of Search ...................... 395/124; 364/413.14, 364/413.19

[56] References Cited

U.S. PATENT DOCUMENTS

| | | | |
|---|---|---|---|
| 4,641,351 | 2/1987 | Preston | 382/154 |
| 4,719,585 | 1/1988 | Cline et al. | 395/124 |
| 4,821,210 | 4/1989 | Rumbaugh | 395/121 |
| 4,821,213 | 4/1989 | Cline et al. | 395/124 |
| 4,879,668 | 11/1989 | Cline et al. | 395/124 |
| 4,947,347 | 8/1990 | Sato | 395/121 |
| 4,984,157 | 1/1991 | Cline et al. | 364/413.13 |
| 4,987,554 | 1/1991 | Kaufman | 395/124 |
| 5,113,357 | 5/1992 | Johnson et al. | 395/124 |
| 5,113,490 | 5/1992 | Winget | 395/119 |
| 5,222,202 | 6/1993 | Koyamada | 395/123 |
| 5,345,490 | 9/1994 | Finnigan et al. | 378/4 |

OTHER PUBLICATIONS

"Raytracing Irregular Volume Data," Garrity, *Comput. Graph.*, vol. 24, No. 5, pp. 36–40, Nov. 1990.

"A Decomposition Algorithm for Visualizing Irregular Grids", Neeman, *Comput. Graph.*, vol. 24, No. 5, pp. 49–56, Nov. 1990.

"A Polygonal Approximation to Direct Scalar Volume Rendering,", *Comput. Graph*, vol. 24, No. 5, pp. 63–70, Nov. 1990.

"New Workstation Graphics for Engineers," *Comput.–Aided Eng.*, (USA) vol. 9, No. 9, pp. 40–41, Sep. 1990 (Abstract).

"An Oriented Finite Element Model for Shearwall Analysis," *Thin–Walled Struct.*, (UK) vol. 5, No. 6, pp. 401–410, 1987, REF. (Abstract).

"A Three–Dimensional Finite–Element Model for Simulating Water Flown in Variably Saturated Porous Media," *Water Resour. Res.* (USA), vol. 22, No. 13, pp. 1790–1808, Dec. 1986, 19 REF. (Abstract).

"Slicing Up Finite–Element Matrices," *Mach. Des.*, (USA), vol. 56, No. 3, pp. 79–82, 9 Feb. 1984, O REF. (Abstract).

"A New Front to Back Composition Technique for Volume Rendering," *CG International '90 Computer Graphics Around the World*, pp. 149–174, 1990, 26 REF. (Abstract).

"Efficient Ray Tracing of Volume Data," *ACM Trans. Graph.*, (USA), vol. 9, No. 3, pp. 245–261, Jul. 1990, 35 REF.

(List continued on next page.)

*Primary Examiner*—Heather R. Herndon
*Assistant Examiner*—Rudolph Buchel
*Attorney, Agent, or Firm*—Jenkens & Gilchrist

[57] ABSTRACT

The present invention converts an unstructured grid of finite volume data to a rectangular grid of voxel definitions for use by a volume rendering technique operable on such a rectangular grid of voxel definitions. The unstructured finite element grid is sliced using a slicing process generating intersection polygons at scalar data at polygon vertices. This vertex scalar data is then mapped to shades of a color based on a linear mapping function. A linear interpolation is then utilized to generate a rectangular two dimensional array, for each slicing interval, which is dependent upon a pixel resolution of the display device utilized within the data processing system implementing the present invention. Each pixel represents a three-dimensional point in the viewing coordinate space wherein each pixel represents a voxel corner. The color of each pixel is used to determine the scalar value to be associated with each voxel corner. This created rectilinear grid of voxel definitions is then utilized within a volume rendering process operable on data associated with rectangular grids.

9 Claims, 9 Drawing Sheets

OTHER PUBLICATIONS

"Interactive Visualization of 3D Medical Data," *Computer*, (USA), vol. 22, No. 8, pp. 46–51, Aug., 1989, 12 REF. (Abstract).

"V–Buffer: Visible Volume Rendering," *Comput. Graph.* (USA), vol. 22, No. 4, pp. 59–64, Aug. 1988, 21 REF.

"SCOPE: Solid and Colored Object Projection Environment," *Syst. & Comput. Jpn.*, (USA) vol. 17, No. 2, pp. 97–104, Feb. 1986, 8 REF. ( Abstract).

"Solid and Colored Object Projection Environment–SCOPE," *Trans. Inst. Electron. & Commun. Eng. Jpn. Part D (Japan)*, vol. J68D, No. 4, pp. 741–748, Apr. 1985, 8 REF. (Abstract).

"Octree–Based Modelling of Computed–Tomography Images," *IEE Proc. I, Commun. Speech Vis.*, (UK), vol. 137, No. 3, pp. 118–122, Jun. 1990, 6 REF. (Abstract).

"Peano Relations in CADCAM Databases," Proceedings of the International Conference on Data and Knowledge Systems for Manufacturing and Engineering, *IEEE Comput. Soc. Press*, pp. 115–123, 1987, 17 REF. (Abstract).

"A General Version of Crow's Shadow Volumes," *IEEE Comput. Graphics & Appl.* (USA), vol. 6, No. 9, pp. 17–28, Sep. 1985, 17 REF. (Abstract).

"Enhanced Visualization of Multi–Dimensional Structures," Proceedings Visualization '91, (Cat. No. 91CH3046–0), *IEEE Comput. Soc. Press*, pp. 188–193, 422, 1991, 8 REF. (Abstract).

"Ultrasonic Synthetic Aperture Imaging Used to Measure 2D Velocity Fields in Real Time," 1991 IEEE International Symposium on Circuits and Systems, (Cat. No. 91CH3006–4), *IEEE*, vol. 5, pp. 738–741, 1991, 3 REF. (Abstract).

"Three Dimensional Reconstruction of a Small Fetal Phantom Using Real–Time Linear Array Ultrasonic Images," *Medical Informatics Europe 1991*, Proceedings, pp. 529–533, 1991, 3 REF. (Abstract).

"Volume Rendering and Bicolour Scale in Double Isotope Studies: Application to Immuoscintigraphy and Bone Landmarking," *Eur. J. Nucl. Med.* (Germany), vol. 19, No. 3, pp. 201–204, Mar. 1992, 6 REF., (Abstract).

"A Procedural Interface for Volume Rendering," Proceedings of the First IEEE Conference on Visualization., (Cat. No. 90CH2914–0), *IEEE Comput. Soc. Press*, pp. 36–44, 462, 1990, 9 REF. (Abstract).

"The Application of Transport Theory to Visualization of 3–D Scalar Data Fields," *Comput. Phys.* (USA), vol. 5, No,. 4, pp. 397–406, Jul.–Aug. 1991, 24 REF. (Abstract).

"Visualization of 3D Scalar Data Fields," *Inf. Tech–IT.*, (Germany, vol. 33, No. 2, pp. 72–76, Apr. 1991, 11 REF. (Abstract).

"Volume Rendering and Data Feature Enhancement," *Comput. Graph.*, (USA), vol. 24, No. 5, pp. 21–26, Nov. 1990, 24 REF. (Abstract).

"Strategies for Scientific Visualization Analysis and Comparison of Current Techniques," *Proc. SPIE–Int. Soc. Opt. Eng.* (USA), vol. 1259, pp. 110–121, 1990, 5 REF. (Abstract).

"Visualization of Ventricles of the Brain by Volume Rendering," *Images of the Twenty–First Century*. Proceedings of the Annual International Conf. of the IEEE Engineering in Medicine and Biology Society, (Cat. No. 89CH2770–6), Seattle, WA, pp. 9–12, Nov. 1989, (Abstract).

"Three Dimensional Graphic Renderings of Cardiac Magnetic Resonance Images," *Images of the Twenty–First Century*. Proceedings of the Annual International Conf. of the IEEE Engineering in Medicine and Biology Society, (Cat. No. 89CH2770–6), Seattle, WA, pp. 9–12, Nov. 1989, (Abstract).

"Volume Rendering for Display of Multiple Organs, Treatment Objects and Image Intensities," *Proc. SPIE–Int. Soc. Opt. Eng.*, (USA), vol. 1137, pp. 92–97, 1989, 9 REF., (Abstract).

"A Hybrid Ray Tracer for Rendering Polygon and Volume Data," *IEEE Comput. Graph. Appl.*, (USA), vol. 10, No. 2, pp. 33–40, Mar. 1990, 24 REF. (Abstract).

"Volume Rendering," *Comput. Graph.*, (USA), vol. 22, No. 4, pp. 110–119, Aug. 1988, 34 REF.

"An Algorithm for Three Dimensional Visualization of Radiation Therapy Beams," *Med. Phys.*, (USA), vol. 15, No. 1, pp. 24–29, Jan.–Feb. 1988, 16 REF. (Abstract).

"Rendering Algorithm for Visualizing Voxel and Surface Data.," *IBM Technical Disclosure Bulletin*, No. 11, Apr., 1990, pp. 57–60, (Abstract).

"Raytracing Irregular Volume Data," *Comput. Graph*, vol. 24, No. 5, Nov., 1990.

"Marching Cubes: A High Resolution 3D Surface Construction Algorithm," *Comput. Graph*, vol. 21, No. 4, Jul., 1987, pp. 163–169.

"Volume Rendering: Display of Surfaces from Volume Data," *IEEE Comp. Graph. & App.*, May, 1988, pp. 29–37.

THIRD PLANE OF VOXELS
SECOND PLANE OF VOXELS
FIRST PLANE OF VOXELS

IMAGE PLANE:
P x P PIXELS

VOLUME DATA:
N x N x N VOXELS

IMAGE SPACE:
P x P x W SAMPLES

A SAMPLE FOR
COLOR AND OPACITY

RECTANGULAR/
RECTILINEAR
GRID

CELL OR VOXEL

IRREGULAR GRID

UNSTRUCTURED
GRID

SYSTEM AND METHOD FOR VOLUME RENDERING OF FINITE ELEMENT MODELS

TECHNICAL FIELD OF THE INVENTION

The present invention relates in general to data processing systems, and in particular, to a system and method for converting finite element data to rectilinear voxel data.

BACKGROUND OF THE INVENTION

Volume data is simply defined as observed or calculated data associated with a region in three dimensional space. The data can be scalars (e.g., temperature, material density), vectors (e.g., fluid velocity, color), tensors (e.g., stress), etc. Volume visualization then pertains to graphical techniques that assist in the understanding of such volume data.

Volume data may be classified into two types: one in which data is associated with points that have no special relationship to one another, and another in which the data points reflect some underlying geometry. FIG.10 illustrates examples of various geometries associated with volume data. For example, medical CAT scan data is generally based on rectangular grids. Finite difference data may be rectangular or irregular. And, finite element data may be rectangular, irregular or unstructured.

In the following discussion, the term "cell" and "voxel" are used interchangeably. Each cell/voxel is a rectangular parallelepiped with attributes (e.g., color, density, temperature) at its corners. Within each cell, attributes are assumed to vary linearly.

The types of visualization techniques applied to volume data with underlying geometry are of two classes, volume modeling and volume rendering. Volume modeling methods extract intermediate geometry from volume data for visualization purposes. For example, one can generate contour/iso surfaces as is discussed within Lorenson, W. E. and Cline, H. E., "Marching Cubes: A High Resolution 3D Surface Construction Algorithm," *Computer Graphics*, Volume 21, No. 4, July 1987, pp. 163–169; Gallagher, R. S. and Nagtegall, J. C., "An Efficient 3-D Visualization Technique for Finite Element Models and Other Coarse Volumes," *Computer Graphics*, Volume 23, No. 3, July 1989, pp. 185–194; and U.S. Patent application (Ser. No. 08/222,512), now U.S. Pat. No. 5,454,068, which are hereby incorporated by reference herein. Another technique is to pass a cutting plane through the volume and show data color coded on the cutting plane, as is disclosed in the above-referenced patent application. Such techniques, however, do not allow the entire volume to be visualized at once.

Volume rendering involves techniques where the model is rendered as a colored semi-transparent gel. In volume rendering methods, color and opacity are assigned to each voxel. Images are formed from the resulting colored semi-transparent volume by blending or compositing together voxels projecting to the same pixel on the picture plane. Please refer to Upson, C. and Keeler, M., "VBUFFER: Visual Volume Rendering," *Computer Graphics*, Volume 22, No. 4, August 1988, pp. 59–64; Drebin, R. A., Carpenter, L., and Hanrahan, P., "Volume Rendering," *Computer Graphics*, "Volume 22, No. 4, August 1988, pp. 65–74; and Levoy, M., "Volume Visualization Algorithms and Architectures," *SIGGRAPH Course Notes*, August 1990, and U.S. Patent application Ser. No. 07/991,019 assigned to a common assignee, which are hereby incorporated by reference herein.

Upson discloses an algorithm that operates on volume models that are made of rectilinear computational cells (rectangular grids) where scalar values to be visualized are present at the cell corners. Within each cell interior, these scalar values are assumed to vary trilinearly. Referring next to FIG. 2, mapping functions may be chosen that map a scalar value to a color and opacity. These functions are useful in isolating information through variation in opacity and highlighting that information through color. For example, in FIG. 2, contour/iso surfaces at particular thresholds may be obtained by specifying narrow steps or peaks in the opacity mapping function. Processing of these cells may be done in one of two ways.

One method uses ray casting. At each pixel a ray is tracked through the volume until either the accumulated opacity reaches unity or the volume is exhausted, at which time the accumulated colors and opacity are stored and the processing moves on to the next pixel. Within each cell, numerical integration over the intersection ray length is performed to arrive at color and opacity contributions from that cell.

Another method sweeps the volume domain one cell at a time, scan converting each cell and blending the resulting voxel image with the contents of the image buffer. Since the volume domain is rectilinear, it is possible to determine which cells occlude or partially occlude others (refer to FIG. 3). Cells are processed starting with those on the plane closest to the view point and progress plane-by-plane until the farthest cells have been processed. The processing order of cells within each plane proceeds from the closest cell to those adjoining this cell according to their distance from the viewpoint.

Both these methods use front-to-back processing with the following equations for blending pixels:

$$C_r = C_c + (1 - A_c) * (A_i * C_i)$$

$$A_r \div A_c = (1 - A_c) * A_i$$

where C denotes color, A denotes opacity (an opacity value of 0 implies total transparency and a value of 1 implies total opaqueness), i denotes the incoming new value, c denotes current content of the image buffer, and r denotes the result of blending (which will be written back into the image buffer after every blend).

The process discussed within Levoy also utilizes ray casting, in a manner as similarly illustrated in FIG. 4. However, along each ray, colors and opacity are sampled W times and blended front-to-back. One major assumption in this technique is that the spacing between pixels is less than or equal to the cell size in volume data.

From the above discussions, it may be discerned that the major steps in volume rendering are: (1) operate on volume data from front-to-back; (2) compute colors and opacity values; and (3) blend together colors and opacity when processing front-to -back.

While ray casting approaches are more flexible in that they can operate on an unstructured mesh or grid of volume data directly, they are more expensive to design and implement. The other class of volume rendering techniques are more common and less expensive, but generally must operate on voxel-based rectangular grid definitions. However, in order to use such voxel-based methods, unstructured grids of finite volume data must be convened to rectangular grids of voxel definitions.

Thus, there is a need in the an for a technique for convening finite element models to voxel definitions for use by volume rendering algorithms that operate on data associated with rectangular grids.

SUMMARY OF THE INVENTION

Thus, it is an objective of the present invention to convert an inputted unstructured finite element grid into a grid of voxel data for use by a volume rendering process that is operable on data associated with rectangular grids. This preprocessing technique transforms model coordinates into viewing coordinates and begins slicing, using a slicing process, the model in a manner perpendicular to the viewing direction, resulting in a generation of intersection polygons with scalar data at polygon vertices. These vertex scalar data are mapped to a range of attributes, preferably shades of a color, based on a linear mapping function. Thereafter, during each slicing interval, a rectangular array of data points is generated through the use of linear interpolation of the attribute ranges associated with the polygon vertices. This rectangular array is preferably dependent upon the pixel resolution of an associated display device. Each pixel now represents a three-dimensional point in the viewing coordinate space, i.e., each pixel now represents a voxel corner. The color of each pixel is used to determine the scalar value to be associated with the associated voxel corner.

Pixel colors that are black represent points outside the finite element volume. This rectangular grid of data may now be utilized by any one of a number of typical volume rendering processes that operate on data associated with rectangular grids.

In an alternative embodiment, the range of attributes may be a range of sounds, such as the scaling of a tone.

Color and opacity are blended for each slicing interval with respect to each pixel. A front-to-back blending process is then utilized.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
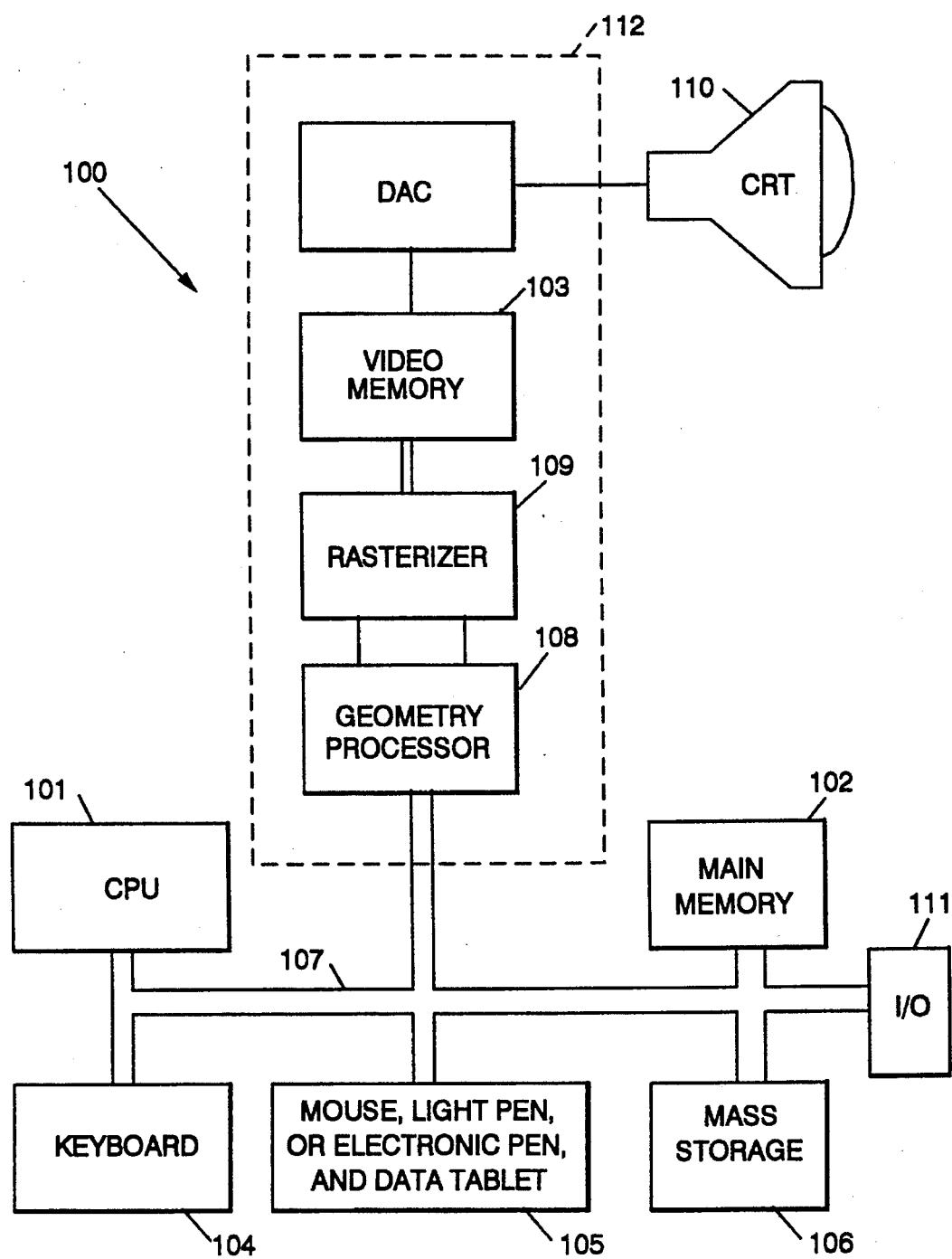
FIG.1 illustrates a data processing system implementing a preferred embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views..

While the present invention may advantageously be implemented on nearly any conventional data processing system, exemplary data processing system 100 on which the present invention is implemented is shown in FIG. 1.

FIG. 1 illustrates a preferred embodiment of hardware system 100 implementing the present invention as part of a data processing system. In FIG. 1, system 100 includes CPU 101, main memory 102, graphics processor 112, keyboard 104 for user input, supplemented by conventional mouse (or light pen, electronic pen, and data tablet) 105 for manipulating graphic images according to the present invention, and mass storage 106 which may include both fixed and removable media using any one or more of magnetic, optical or magneto-optical storage technology or any other available mass storage technology. These components are interconnected via conventional bidirectional system bus 107. Bus 107 contains address lines for addressing any portion of memory 102 and 103. System bus 107 also includes a data bus for transferring data between and among CPU 101, main memory 102, graphics processor 112, mass storage 106, and input/output ("I/O") port 111. In a preferred embodiment of system 100, CPU 101 may be any suitable microprocessor or microcomputer. I/O port 111 enables system 100 to have access to the "outside world"(e.g., external systems and processes).

Conventional graphics processor 112 receives the three-dimensional polygon data described herein and converts them into pixels, which are displayed upon CRT 110. Processor 112 includes geometry processor 108, rasterizer 109, video memory 103, and DAC (digital-to-analog convertor) 113. Geometry processor 108 receives the three-dimensional polygon data, performs lighting calculations to derive colors at the corners of the polygons, and performs viewing transformations discussed herein.

This transformed data is then handed to rasterizer 109, which "fills-in" the polygons, which is then stored in video memory 113, which includes frame buffers, Z buffers and alpha buffers (planes). DAC 113 then converts this stored data to an analog form for display on CRT 110. Graphics processor 112 may be IBM graphics system GXT 1000, which is commercially available.

Main memory 102 of system 100 is a conventional dynamic random access memory of suitable size. Monitor 110 is of a type suitable for displaying graphical images preferably having a resolution of 1280 pixels wide by 1024 pixels high. However, any type of display may be used to implement the present invention.

One of the key ideas of the ray casting method discussed earlier was the aspect of sampling for colors and opacity at intervals within the volume. Such a sampling can easily be done by using a conventional slicing process, such as a SLICER program as disclosed within the above-referenced U.S. patent application Ser. No. 08/222,512, now U.S. Pat. No. 5,954,068, which is hereby incorporated by reference herein. This program generates color coded Gouraud shaded slices of a finite element model along any one specified direction at interactive speeds (slices are preferably perpendicular to the specified direction).

Figure 5:
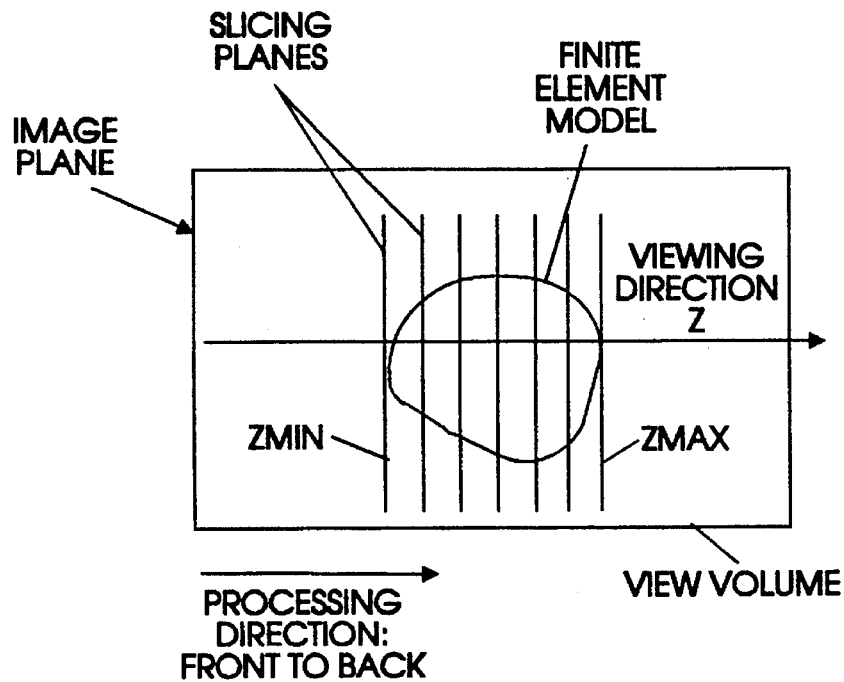
FIG. 5 illustrates slicing.

The basis of a volume rendering process then, is to allow the SLICER program to generate slices along the viewing direction from front-to-back and blend the slices together, as illustrated in FIG. 5. Given a viewing direction, model coordinates are transformed into a viewing coordinate space. Viewing transformations for graphics processor 112 are set up so that the model is being looked at along the transformed models'Z direction (this will be an identity matrix).

Figure 2A:
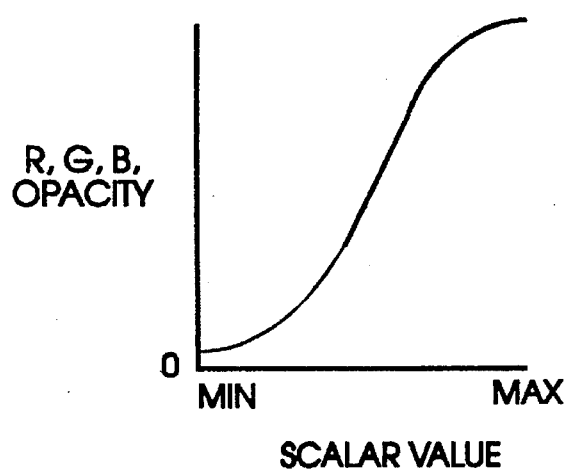
FIG. 2 illustrates prior art examples of functions that map scalar values to color or opacity.
Figure 2B:
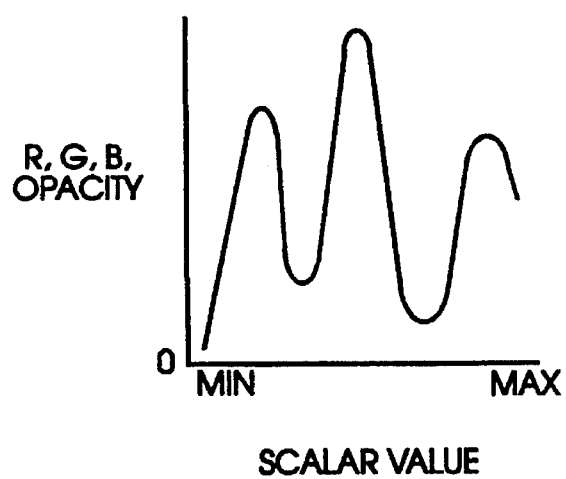
Figure 2C:
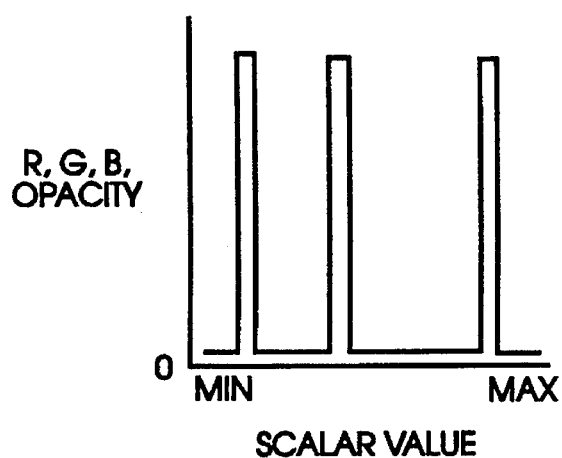
Figure 3:
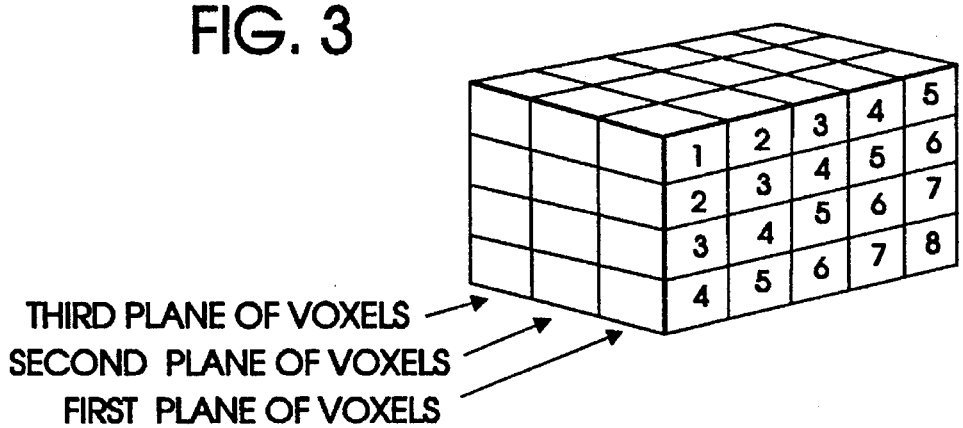
FIG. 3 illustrates a prior art voxel processing order in Upson's algorithm.
Figure 4:
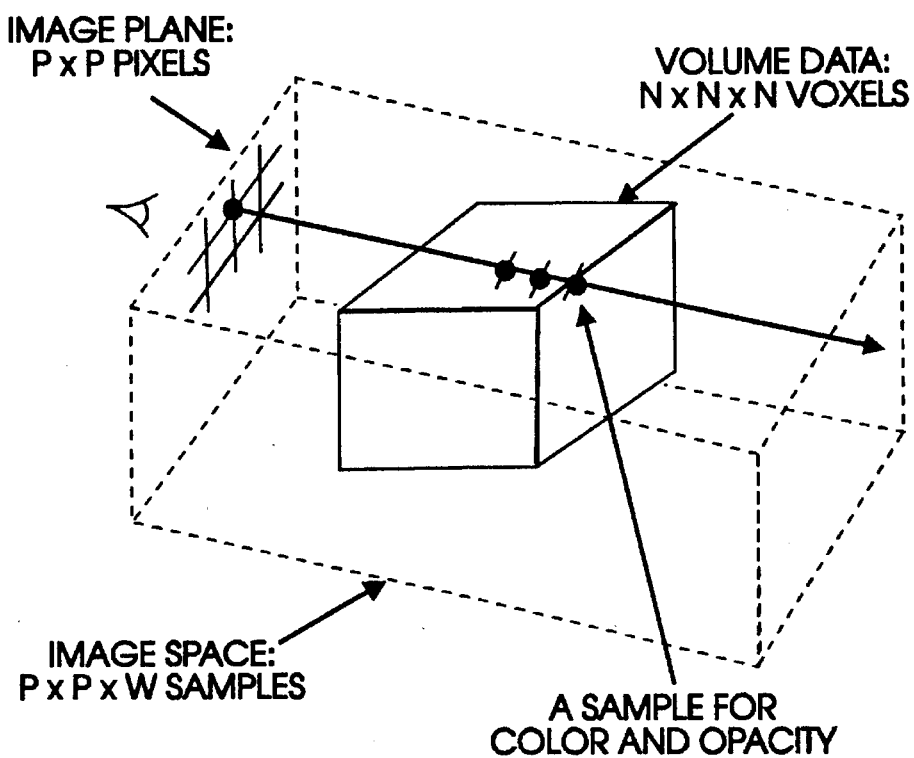
FIG. 4 illustrates a prior art ray casting process.
Figure 6:
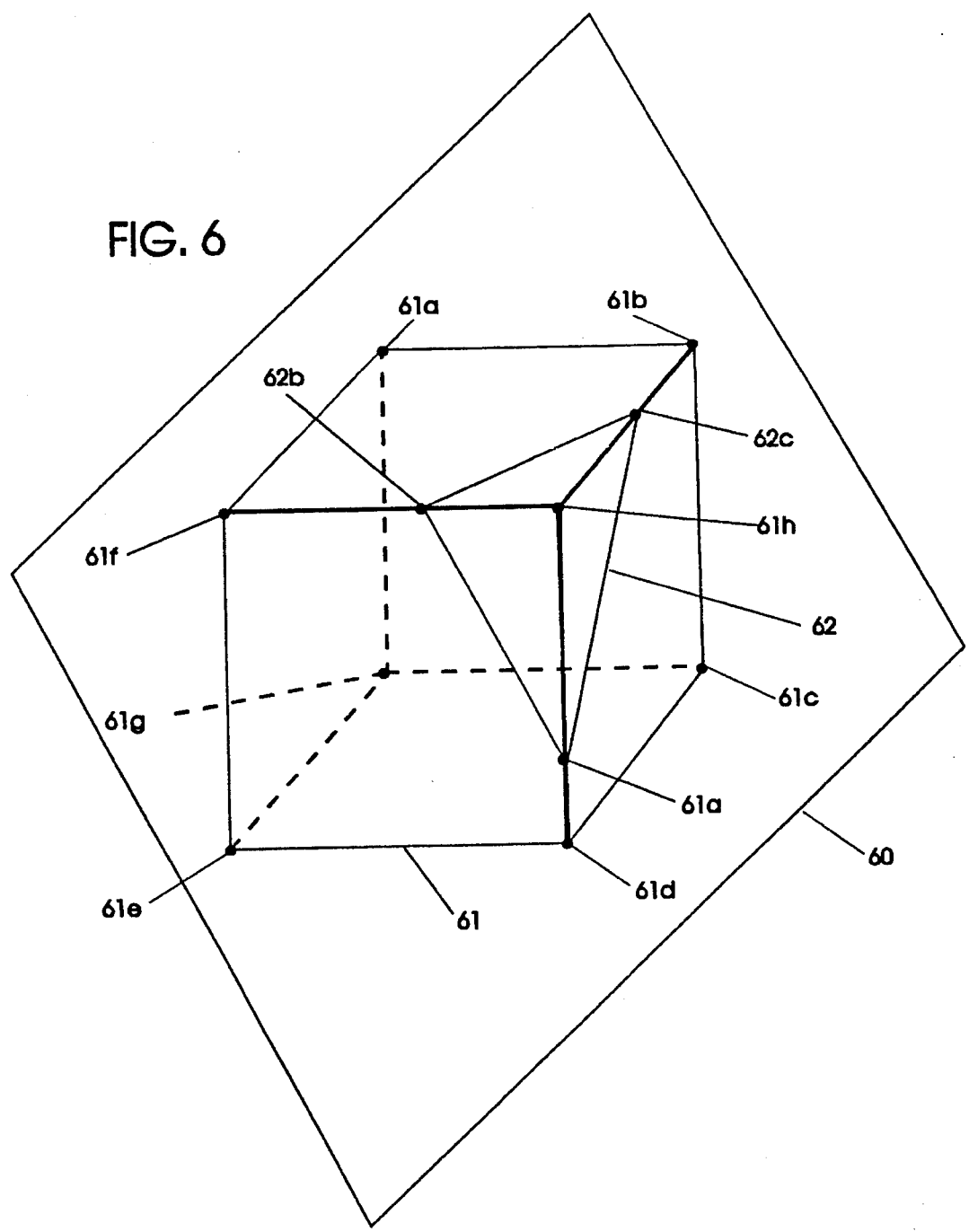
FIG. 6 illustrates generation of a polygon as the result of a slice.

Referring to FIG. 6, the SLICER program, at each slicing location, intersects the model 61 with a cutting plane 60 perpendicular to the viewing direction generating intersection polygons 62. In addition, scaler results to be visualized are computed through linear interpolation at the vertices 62a, b, c of the intersection polygons 62. For example, vertex 62b is derived through linear interpolation from vertices 61f and 61h, while vertex 62c is derived through linear interpolation from 61h and 61b, and vertex 62a is computed through linear interpolation from vertices 61h and 61d. Mapping functions, which may be defined by the user, are then applied to the vertex scalar values to derive vertex color and opacity values (see FIG. 2). The result is that at each slicing plane 60, intersection polygons 62 with vertex colors and opacity values (also referred to as alpha values) are obtained. If graphics processor 112 within system 100 supports Gouraud shading and alpha interpolation within a polygon, the intersection polygons 62 may be easily scan converted to pixels with colors and alpha values. Scan conversion is a well-known process.

As slices are computed and scan converted, they are blended together in a frame buffer within graphics processor 112. During blending, alpha or opacity values are accumulated at each pixel. If graphics processor 112 supports alpha planes with special pixel blending capabilities, then volume rendering of a finite element model is accomplished. Alpha planes/alpha buffer is the location in video memory 103 where current opacity values for each pixel are stored; usually the alpha buffer is 8 bits deep for each pixel.

One of the advantages of the present invention is that it utilizes a unique blending function implementing the following pixel blend:

$$C_r = C_c + MIN(1-A_c, A_i) * C_i$$

$$A_r = A_c + MIN(1-A_c, A_i)$$

In these formulas, C denotes color, A denotes alpha or opacity value, c denotes current frame buffer content for color or current alpha plane content for alpha, i denotes the incoming new value, r denotes the result of the blending operation (which is placed into the frame buffer in case of C or into alpha planes in case of A. MIN is a "minimum" function returning the smallest of its two arguments.

Comparing this to the correct volume rendering blend equations, these unique blending equations approximate the product $(1-A_c)*A_i$ by $MIN(1-A_c, A_i)$. Note that $0<A_c$, $A_i<1$. The behavior of this blending is that as pixels are blended, graphics processor 112 keeps track of the accumulated opacity at each pixel in the alpha planes. When the opacity (alpha) saturates at a pixel, that pixel color will no longer be updated. This unique blending function is then ideally suited for front to back blending of slices utilizing the SLICER process. The advantages of using the approximate blend equation are that it is implemented in the graphics processor itself and it speeds up the volume rendering process compared to those implemented based on, for example, the ray casting approach.

Figure 7:
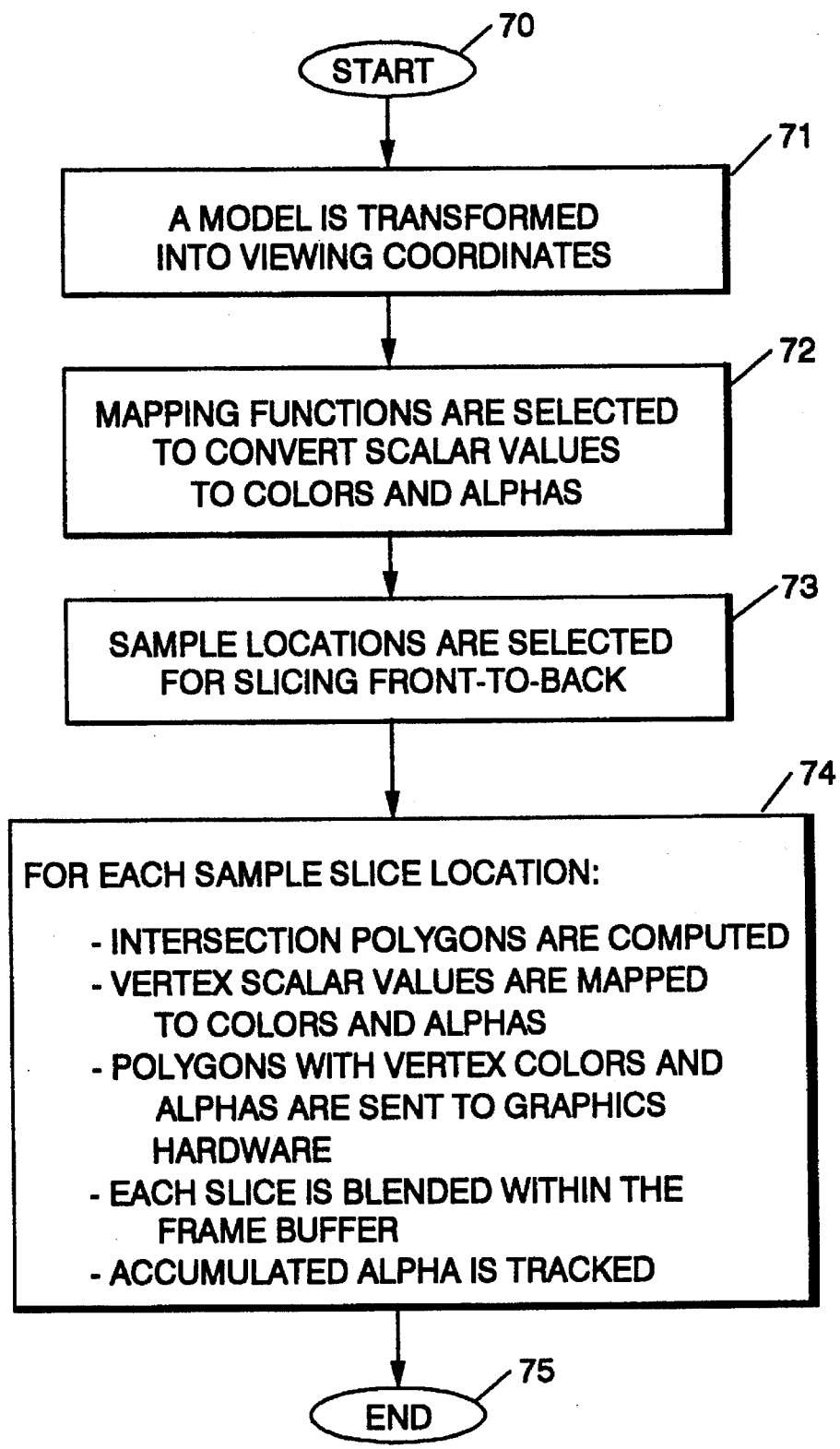
FIG. 7 illustrates a volume rendering process.

Referring next to FIG. 7, there is illustrated the process of the volume rendering process described above, which generates semi-transparent images representing volume data. In step 70, the process begins, wherein it transfers control to step 71 wherein given a viewing direction, a model is transformed into viewing coordinates. Next, in step 72, mapping functions are selected to convert scalar values to colors and alphas. Thereafter, in step 73, sample locations are selected for slicing front to back. Next, in step 74, for each sample slice location, intersection polygons are computed, vertex scalar values are mapped to colors and alphas, polygons with vertex colors and alphas are sent to graphics processor 112, each slice is blended within the frame buffer using the above-identified special blending functions, and hardware tracks accumulated alpha through alpha planes. The process ends at step 75.

The present invention also allows for the embedding of opaque three-dimensional lighted objects made up of polygons within a semi-transparent gel object. To perform this task, high alpha values are assigned to the opaque three-dimensional polygons, wherein they are then rendered with the Z buffer on and then blended with the background. This blend updates the alpha planes with the three-dimensional object's alpha values. Next, the Z buffer is write-protected so that all further rendering does not touch the Z buffer contents. Next, rendering and blending in the slices is performed with a Z compare test. This technique then correctly prevents areas of slices hidden by three-dimensional objects from blending into the scene.

For the above process, the following hardware requirements are: (1) hardware Gouraud shading of polygons; (2) hardware alpha interpolation within polygons; (3) alpha planes (usually 8 bits); (4) hardware/microcode assists to do special pixel blending using a frame buffer; and (5) a Z buffer, if opaque objects need to be embedded within the volume data. Note that these requirements may be met by SGI VGX class graphics workstations from Silicon Graphics, Inc. or IBM's GXT 1000 graphics system.

There are a large number of volume rendering processes that operate on data associated with rectangular grids. The present invention utilizes the aforementioned SLICER program together with Gouraud shading hardware in a preprocessing step for convening an unstructured finite element grid into a grid of voxel data for use by such rendering processes.

Figure 8:
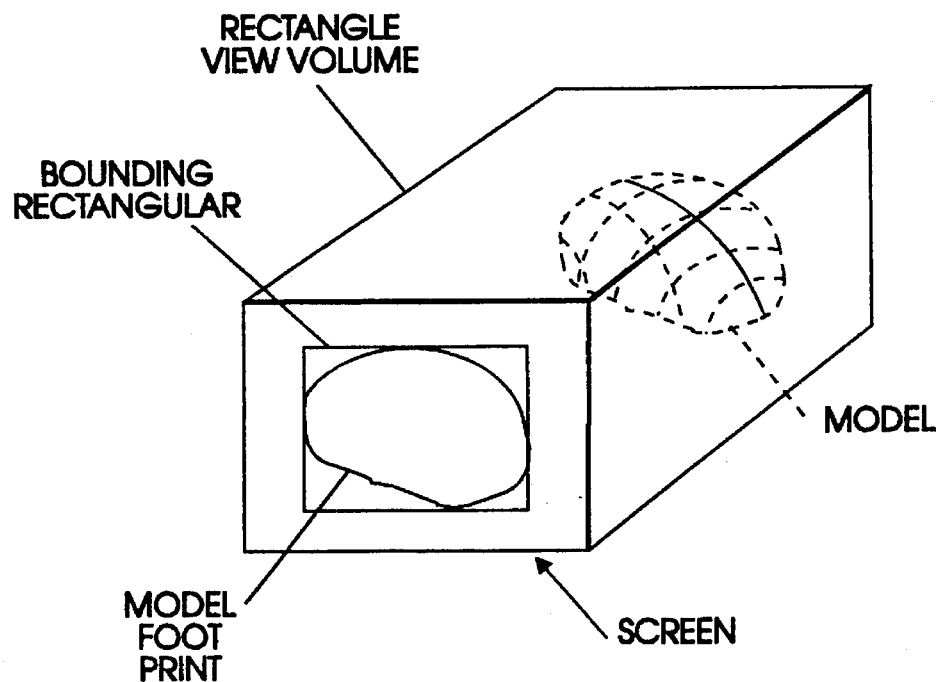
FIG. 8 illustrates a conversion of unstructured grids to voxels.

Given a viewing direction for a model in three-dimensional space, there is a simple relationship between a rectangular viewing coordinate system and the screen coordinate system. In particular, the three-dimensional model casts a footprint on the picture plane perpendicular to the viewing direction as illustrated in FIG. 8. This footprint is bounded by a rectangle whose edges are parallel to the screen coordinate axis. Each pixel within this bounding rectangle is a line in the viewing coordinate system.

Figure 9:
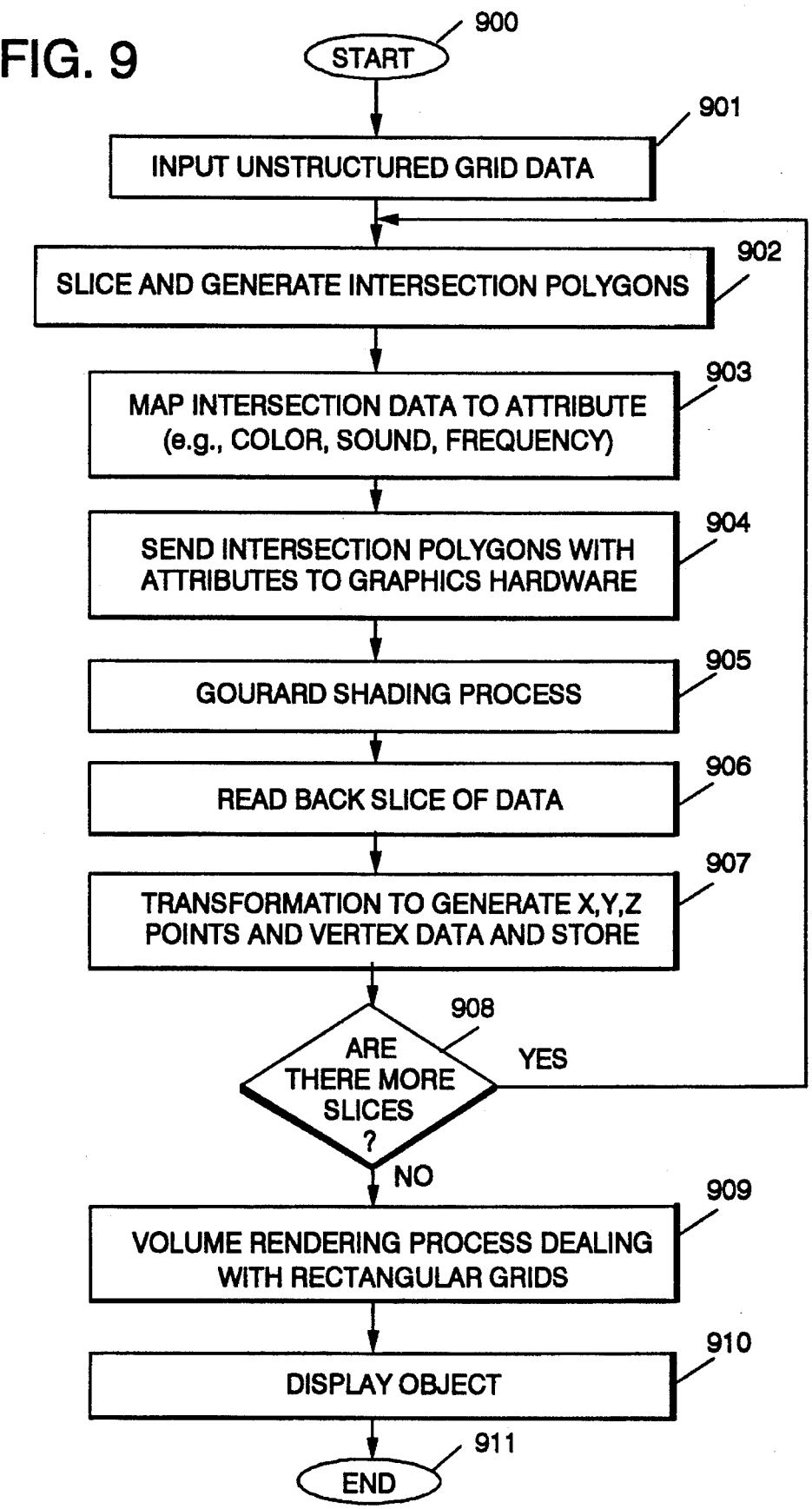
FIG. 9 illustrates a flow diagram in accordance with the present invention.
Figure 10A:
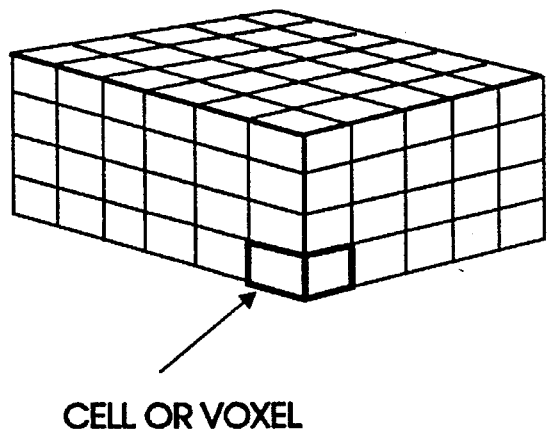
FIG. 10 illustrates prior art examples of geometry associated with volume data.
Figure 10B:
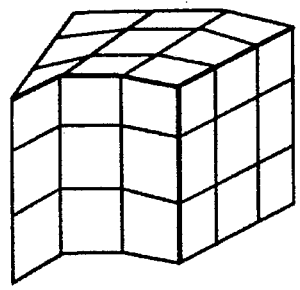
Figure 10C:
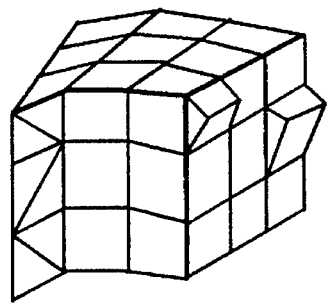

Referring next to FIG. 9, there is illustrated a flow diagram of a preferred embodiment of the present invention. The process begins at step 900 and proceeds to step 901, wherein unstructured grid data is inputted to system 100. Next, in step 902, for each slice perpendicular to the viewing (Z) direction, the SLICING program generates intersection polygons with scalar data at polygon vertices. Next, in step 903, this vertex scalar data is then mapped to shades of a color R ($0<R\leq1$) based on a linear mapping function. Note that the choice of color is not important but only that the mapping is linear. Next, in step 904, the data is sent to graphics hardware, wherein the process performs a Gouraud shading process on these polygons to generate a two-dimensional array of pixel colors (step 905). Often, such shading is dependent upon the pixel resolution of display 110. Thereafter, in step 906, this two-dimensional pixel array (within the bounding rectangle) is read back representing each slice from the frame buffer. For a given slice location, each pixel now represents a three-dimensional point in the viewing coordinate space (i.e., each pixel now represents a voxel corner). The color of a pixel is used to determine the scalar value to be associated with the voxel corner. Pixel colors that are black (background color) represent points outside the finite element volume. The corresponding voxel corners, potentially, may be assigned an opacity of 0, by a volume rendering algorithm. In step 907, a transformation of the data is made to correspond to the "physical location" of that slice of data with respect to the two-dimensional grid of pixels in order to generate x, y, z viewing coordinate points and vertex data pertaining to the previously generated attribute range. These x, y, z points now represent the voxel corners for that slice and are stored for later use by a volume rendering process that operates on data associated with rectangular grids.

Figure 11:
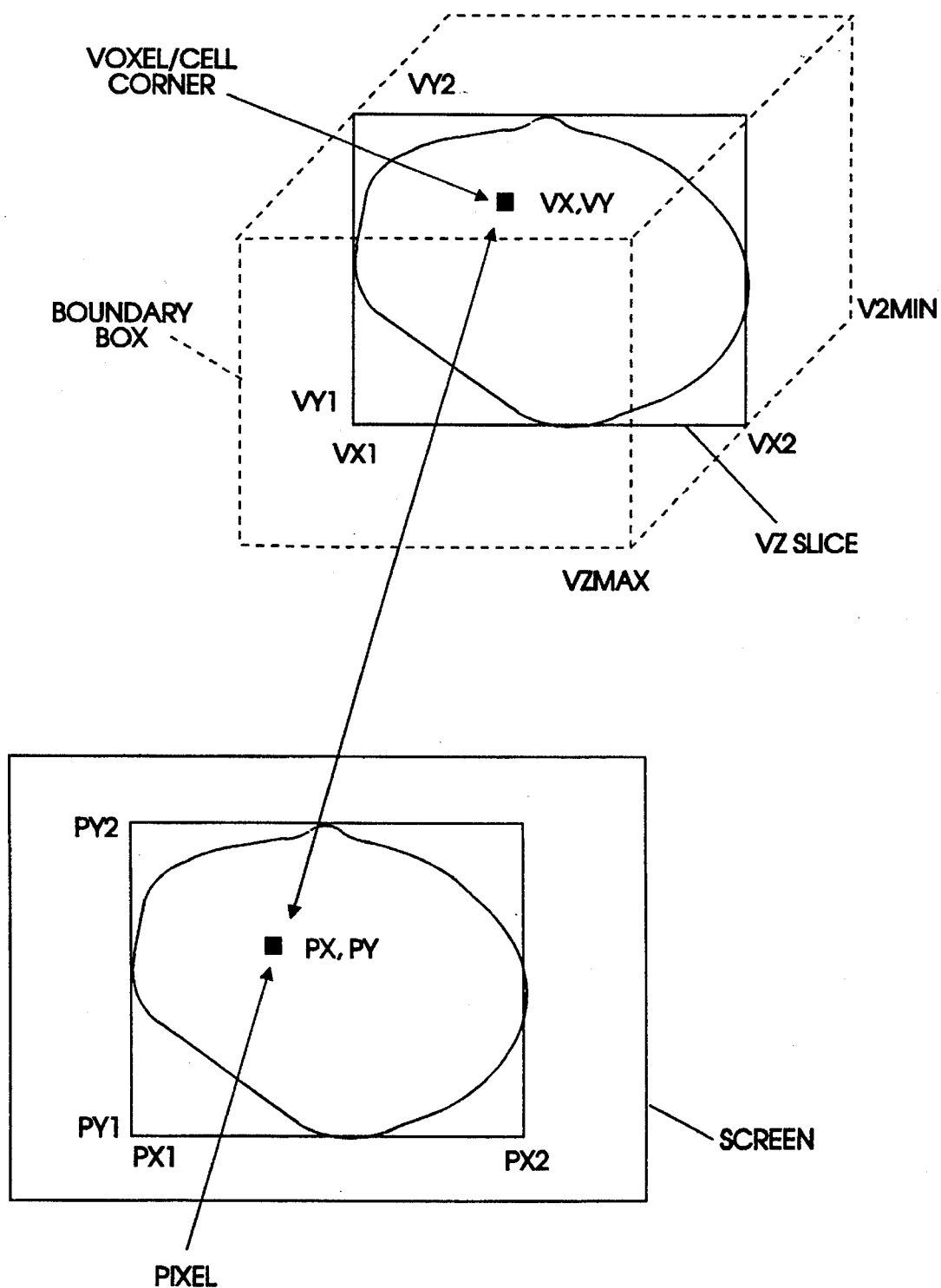
FIG. 11 illustrates a transformation from a screen coordinate system to a rectangular viewing coordinate system.

Referring next to FIG. 11, there is illustrated a visualization of this transformation. Point $P_x$, $P_y$ within the two-dimensional coordinates of the pixel coordinates of the display screen is transformed into point $V_x$, $V_y$, which is a voxel/cell corner for that particular slice at coordinate $V_z$. $V_z$ is known, and $V_x$ and $V_y$ are calculated according to the following formulas:

$$\frac{P_x - P_{x1}}{P_{x2} - P_{x1}} = \frac{V_x - V_{x1}}{V_{x2} - V_{x1}}$$

$$\frac{P_y - P_{y1}}{P_{y2} - P_{y1}} = \frac{V_y - V_{y1}}{V_{y2} - V_{y1}}$$

Thereafter, in step 908, it is determined whether or not there are any more slices to process. If so, the method returns to step 902 for the next slice. Otherwise, the process moves on to step 909. In step 909, all the stored rectilinear voxel definitions from step 907 are given to a volume rendering process that operates on data associated with rectangular grids. In step 910 the object may be displayed as a result of the volume rendering process, and the overall process ends at step 911. Alternatively, as described in FIG. 7, the data as each slice is rendered may be displayed utilizing the unique blending function described above.

With the foregoing hardware in mind, it is possible to explain the process-related features of the present invention. To more clearly describe these features of the present invention, discussion of other conventional features is omitted as being apparent to those skilled in the art. It is assumed that those skilled in the an are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Although the present invention and its advantages have been described in detail, it should be understood that various changes, substitutions and alterations can be made herein without departing from the spirit and scope of the invention as defined by the appended claims.

What is claimed is:

1. A method of converting an unstructured finite element grid to a grid of voxel data, said grid of voxel data to be displayed on a display device, said method comprising the steps of:

inputting data representing said unstructured finite element grid, wherein said unstructured finite element grid represents a three-dimensional object;

performing a plurality of slicing operations upon said unstructured finite element grid in a viewing direction;

generating, during each slicing operation, intersection polygons with scalar data at polygon vertices;

mapping, during each slicing operation, each of said scalar data to shades of a color;

generating, during each slicing operation, a two-dimensional array of pixel colors from said shades of a color; and reading back said two-dimensional array of pixel colors from a frame buffer such that each pixel represents a three dimensional point voxel corner.

2. The method as recited in claim 1, further comprising the step of:

transforming, during each slicing operation, said two-dimensional array of pixel colors to generate x, y, z viewing coordinate points and vertex data.

3. The method as recited in claim 2, further comprises the steps of:

performing a volume rendering process upon the x, y, Z coordinate points to produce an object;

and displaying the object.

4. The method as recited in claim 1, wherein said mapping step further comprising utilizing a linear mapping function to map each of said scalar data.

5. A method comprising the steps of:

inputting representative data of an unstructured finite grid element, wherein said unstructured finite element grid represent an object in three-dimensional space;

generating intersection polygons with scalar data at polygon vertices from said representative data;

generating two-dimensional array of pixel colors from said intersection polygons;

reading the two-dimensional array of pixel colors from a frame buffer, such that each pixel represents a voxel corner;

transforming said two-dimensional array of pixel colors into a rectilinear grid of voxel data; and inputting said rectilinear grid of voxel data into a volume rendering process for subsequent display of the object.

6. A volume rendering system comprising:

means for inputting data representing an unstructured finite element grid, wherein said data representing said unstructured finite element grid represent an object in three-dimensional space;

means for performing a plurality of slicing operations upon said unstructured finite element grid, wherein slices of said unstructured finite element grid are parallel to each other and perpendicular to a direction of viewing of said object;

means for generating, during each slicing operation, intersection polygons with scalar data at polygon vertices;

means for linearly mapping, during each slicing operation, each of said scalar data to a shade of a color;

means for generating, during each slicing operation, a rectangular array of data points by linear interpolation of said color shades associated with said polygon vertices, wherein said rectangular array is dependent on a pixel resolution of a display device;

means for reading, for each slicing operation, said rectangular array of data points from a frame buffer such that each pixel represents a voxel corner:

means for inputting said rectangular array of data points into a volume rendering process capable of handling said rectangular array of data points; and means for displaying said object as a result of said volume rendering process using said rectangular array of data points.

7. A data processing system, comprising:

an input device for inputting data representing an unstructured finite element grid, wherein said data representing said unstructured finite element grid represents an object in three-dimensional space;

a processor, coupled to said input device by a bus, said processor performs a pre-processing algorithm upon said data representing said unstructured finite element grid to produce a rectilinear grid of voxel data, said processor inputting said rectilinear grid of voxel data into a volume rendering process capable of handling said rectilinear grid of voxel data;

a storage device, coupled to said processor and said input device via said bus, for storing said data representing said unstructured finite element grid, said pre-processing algorithm, and said rectilinear grid of voxel data, wherein said storage device includes, for storing said pre-processing algorithm,:

first storage means for storing program instructions that cause said processor to generate intersection polygons with scalar data at polygon vertices from said data representing said unstructured finite grid element;

second storage means for storing program instructions that cause said processor to generate two-dimensional array of pixel colors from said intersection polygons:

third storage means for storing program instructions that cause said processor to read said two-dimensional array of pixel colors from a frame buffer, such that each pixel represents a voxel corner;

fourth storage means for storing program instructions that cause said processor to transform said two-dimensional array of pixel colors into said rectilinear grid of voxel data; and a display device, coupled to said processor, said storage device, and said input device via said bus, for displaying said object as a result of said volume rendering process using said rectilinear grid of voxel data.

8. A volume rendering system comprising:

means for inputting data representing an unstructured finite element grid;

means for performing a plurality of slicing operations upon said unstructured finite element grid;

means for generating, during each slicing operation, intersection polygons with scalar data at polygon vertices;

means for mapping, during each slicing operation, each of said scalar data to a range of an attribute thereby producing mapped data;

means for mapping, during each slicing operation, the mapped data from a frame buffer such that each pixel represents a voxel corner; and means for inputting said mapped data into a volume rendering process, wherein said volume rendering process includes a means for blending, for each pixel, color and opacity accumulated from said each slicing interval.

9. The system as recited in claim 8, wherein color blending, for each pixel, is performed according to the following function:

$$C_r = C_c + MIN(1-A_c, A_i) * C_i$$

and wherein opacity blending, for each pixel, is performed according to the following function:

$$A_r = A_c + MIN(1-A_c, A_i)$$

wherein C denotes said color, A denotes said opacity, c denotes a current frame buffer content for said color or said opacity, i denotes an incoming new color or opacity, r denotes a result of said blending, and MIN is a minimum function returning the smallest of its two arguments.

* * * * *

UNITED STATES PATENT AND TRADEMARK OFFICE
CERTIFICATE OF CORRECTION

PATENT NO. : 5,570,460

DATED : October 29, 1996

INVENTOR(S) : Ramanujam

It is certified that error appears in the above-indentified patent and that said Letters Patent is hereby corrected as shown below:

Column 2, line 37     Replace "$A_r \div A_c = (1-A_c) * A_i$"
                          With --"$A_r = A_c + (1-A_c) * A_i$"--

Column 2, line 64     Replace "an"
                          With --art--

Column 8, line 33     Replace "Z"
                          With --z--

Column 10, line 12    Replace "dement"
                          With --element--

Column 10, line 22    Replace "mapping"
                          With --reading--

Signed and Sealed this

Seventeenth Day of June, 1997

Attest:

BRUCE LEHMAN

*Attesting Officer*     Commissioner of Patents and Trademarks